Figure 1:
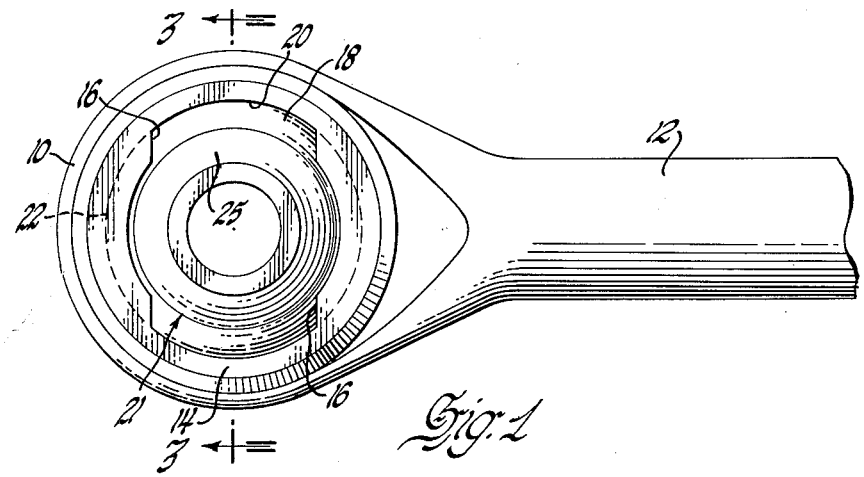

Feb. 6, 1962  D. A. McCASLIN  3,020,101
BALL AND SOCKET CONNECTION
Filed May 7, 1959

INVENTOR.
Donald A. McCaslin
BY
Bryce Beecher
ATTORNEY

United States Patent Office 3,020,101
Patented Feb. 6, 1962

3,020,101
BALL AND SOCKET CONNECTION
Donald A. McCaslin, Cupertino, Calif., assignor to General Motors Corporation, Detroit, Mich., a corporation of Delaware
Filed May 7, 1959, Ser. No. 811,717
2 Claims. (Cl. 308—72)

This invention relates to a rod end construction displaying improved wearing qualities.

Although not limited thereto, the invention has particular relation to the connections between the components of linkage systems of the type employed to actuate control mechanisms associated with certain engines.

In the case of the conventional rod end design, it has been found that the pounding between the ball and socket resulting from the high frequency engine vibrations produces excessive clearance between such parts, causing the development of "back-lash" in the linkage system, a condition fatal to any precision control. In one instance, by way of illustration, a rod end taken from an engine in actual service was discovered pounded to an extent such that a 1/16" clearance existed between the ball and socket.

The wearing above discussed owes to the fact that the manufacture of the conventional rod end proceeds with swaging or peening-over of the inner edges of the socket-providing member about the ball element, which is thus prevented from becoming displaced with loss of the connection. Because of the swaging or peening operation, the material of which the socket member is formed must not exceed a predetermined degree of hardness.

In accordance with the invention, the socket member may be fabricated of material of any desired hardness with corresponding improvement in its wearing qualities and lengthening in the life of the joint of which it is a part.

Figure 2:
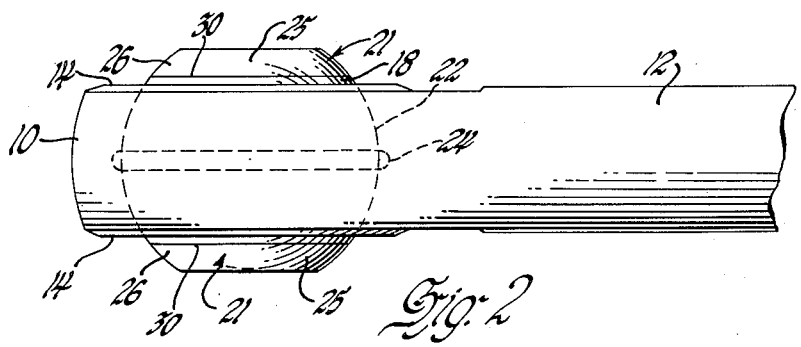
Figure 3:
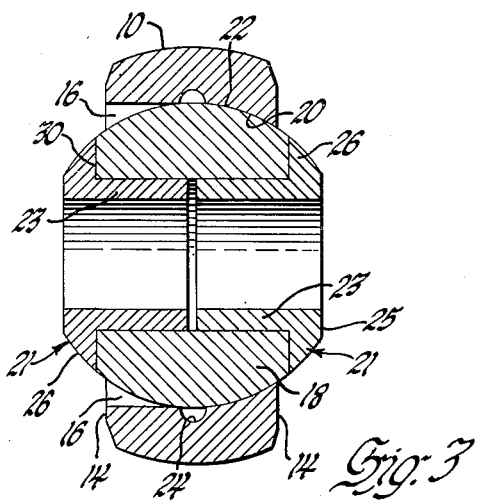
Figure 4:
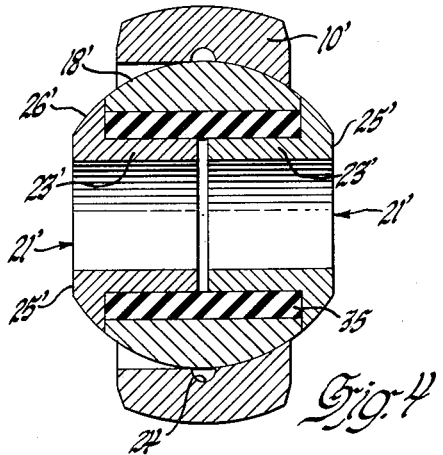

The invention will be described with the aid of the accompanying drawings illustrating the same in a preferred embodiment. In the drawings:

FIGURE 1 is a view which the joint appears in side elevation;
FIGURE 2 shows the joint in plan;
FIGURE 3 is a section on the line 3—3 in FIGURE 1; and
FIGURE 4 is a view similar to FIGURE 3 but illustrating a modification.

As illustrated by FIGURE 1, the socket-providing component 10 of the joint is made integral with a rod 12, shown broken away. Such rod, as is conventional, may be threaded or otherwise formed for connection to a link, not shown.

Member 10 comprises substantially flat side walls 14, one of which has therein a slot 16. In the assembly of the joint the ball element 18 is passed through this slot prior to its being rotated to its shown position.

Member 10 is formed internally to afford an annular concave bearing surface 20 complementary to the annular convex bearing surface 22 of the ball element 18. A groove 24 is supplied in case it should be desired to lubricate the joint.

Following positioning of the ball element within the member 10, a pair of bushings 21 are press fitted into the ball, which will be noted as centrally apertured. These bushings have shank portions 23 accommodated in the aperture and flange portions 25 the inner surfaces of which abut the substantially flat side surfaces or walls 30 of the ball.

As shown, the bushings (FIGURE 3) are fabricated with rounded feathering of the outer peripheral portions 26 of the flanges 25 to the end that the edges of such portions are flush with the outer edges of the walls 30, thereby to increase the axial dimension of the ball and the effective area of the convex bearing surface 22. In this way, the permissible angulation between member 10 and ball element 18 is substantially increased and loss of the ball through the slot 16 precluded.

On the foregoing, it should be understood that no peening or swaging operation is required incident to assembly of the joint and that all of the parts described may be made of a material or materials designed for maximum wear.

In the case of the modification of FIGURE 4 wherein parts similar to parts shown in the other figures are denoted by like numerals, such numerals, however, being primed, there is interposed between ball element 18' and bushings 21' a ring 35 which may be desirably formed of an elastomeric material such as neoprene, for instance, and which serves as a cushion, absorbing vibrations which otherwise might be reflected as wear between the ball element and the socket or cage member 10'. The modified construction is only preferred where the linkage system including the joint is permitted a measure of tolerance in point of lash, since compression of the ring 35 in operation naturally has the effect of introducing a modicum of lash into the system.

What is claimed is:

1. A rod end connection comprising a substantially flat-sided cage member having a slot in one side wall and an annular concave internal bearing surface, a substantially flat-sided centrally apertured bearing element within said cage having an annular convex bearing surface complementary to said first bearing surface, said annular convex bearing surface extending substantially beyond the sides of said cage member and a pair of bushing members each having a shank portion accommodated in the aperture of said bearing element and flanges abutting the opposed sides of such element, the outer peripheral surfaces of said flanges being rounded and feathered to increase the effective area of said convex bearing surface, said bushings in operation preventing dislodgment of said element through said slot.

2. A rod end connection as defined by claim 1 where an elastic ring is interposed between the wall of said aperture and the shank portions of said bushings.

References Cited in the file of this patent

UNITED STATES PATENTS

| | | |
|---|---|---|
| 2,309,281 | Steele | Jan. 26, 1943 |
| 2,350,482 | Venditty | June 6, 1944 |
| 2,423,684 | Collito | July 8, 1947 |
| 2,804,679 | Tracy | Sept. 3, 1957 |

FOREIGN PATENTS

| | | |
|---|---|---|
| 575,081 | Great Britain | Feb. 1, 1946 |
| 637,901 | Great Britain | May 31, 1950 |